(12) United States Patent
Abotabl et al.

(10) Patent No.: US 12,376,120 B2
(45) Date of Patent: Jul. 29, 2025

(54) TYPE 0 RESOURCE ALLOCATION IN SUB-BAND FULL-DUPLEX SLOTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 17/817,953

(22) Filed: Aug. 5, 2022

(65) Prior Publication Data

US 2024/0049241 A1 Feb. 8, 2024

(51) Int. Cl.
*H04W 72/23* (2023.01)
*H04L 27/26* (2006.01)
*H04W 72/0453* (2023.01)
*H04W 72/541* (2023.01)

(52) U.S. Cl.
CPC ......... *H04W 72/23* (2023.01); *H04L 27/2605* (2013.01); *H04W 72/0453* (2013.01); *H04W 72/541* (2023.01)

(58) Field of Classification Search
None
See application file for complete search history.

(56) References Cited

U.S. PATENT DOCUMENTS

| 12,130,688 B2 * | 10/2024 | Khanna ................. Y02D 10/00 |
| 2021/0336759 A1 * | 10/2021 | Abdelghaffar ........ H04W 72/23 |
| 2021/0352667 A1 | 11/2021 | Abotabl et al. |

(Continued)

FOREIGN PATENT DOCUMENTS

| WO | 2021253047 A1 | 12/2021 |
| WO | 2022056822 A1 | 3/2022 |

OTHER PUBLICATIONS

International Search Report and Written Opinion—PCT/US2023/027081—ISA/EPO—Oct. 12, 2023.

(Continued)

*Primary Examiner* — Gregory B Sefcheck
*Assistant Examiner* — Benjamin Peter Welte
(74) *Attorney, Agent, or Firm* — Paul M. McAdams; Procopio, Cory, Hargreaves & Savitch LLP

(57) ABSTRACT

Apparatus, methods, and computer program products for full duplex communication are provided. An example method may include receiving a FDRA indication from a network entity, where the FDRA indication allocates a set of scheduling resources in a first band of a DL band or a UL band and includes an indication associated with a resource utilization in a second band of the UL band or the DL band, and where the DL band and the UL band overlap in a time domain. The example method may include receiving, from the network entity, a RRC configuration associated with a guard band between the UL band and the DL band. The example method may include communicating, with the network entity, a UL transmission or a DL transmission based on at least one of the set of scheduling resources, the guard band, or the resource utilization in the second band.

26 Claims, 14 Drawing Sheets

(56) References Cited

U.S. PATENT DOCUMENTS

2022/0104245 A1  3/2022 Xu et al.
2024/0223343 A1* 7/2024 Fakoorian ........... H04W 72/541
2024/0267902 A1* 8/2024 Harada ............. H04W 72/0453
2024/0322965 A1* 9/2024 Park .................. H04W 72/0453

OTHER PUBLICATIONS

3GPP TS 38.214: "3rd Generation Partnership Project, Technical Specification Group Radio Access Network, NR, Physical Layer Procedures for Data (Release 17)", 3GPP Standard, Technical Specification, 3rd Generation Partnership Project (3GPP), Mobile Competence Centre, 650, Route Des Lucioles, F-06921 ,Sophia-Antipolis Cedex, France vol. RAN WG1, No. V17.2.0, Jun. 23, 2022, 229 Pages, Section 5.1.2.2.
Samsung (Moderator): "Draft SID on Evolution of NR Duplex Operation", RP-212707, 3GPP TSG RAN#94-e, Electronic Meeting, Dec. 6-17, 2021, 4 Pages.

* cited by examiner

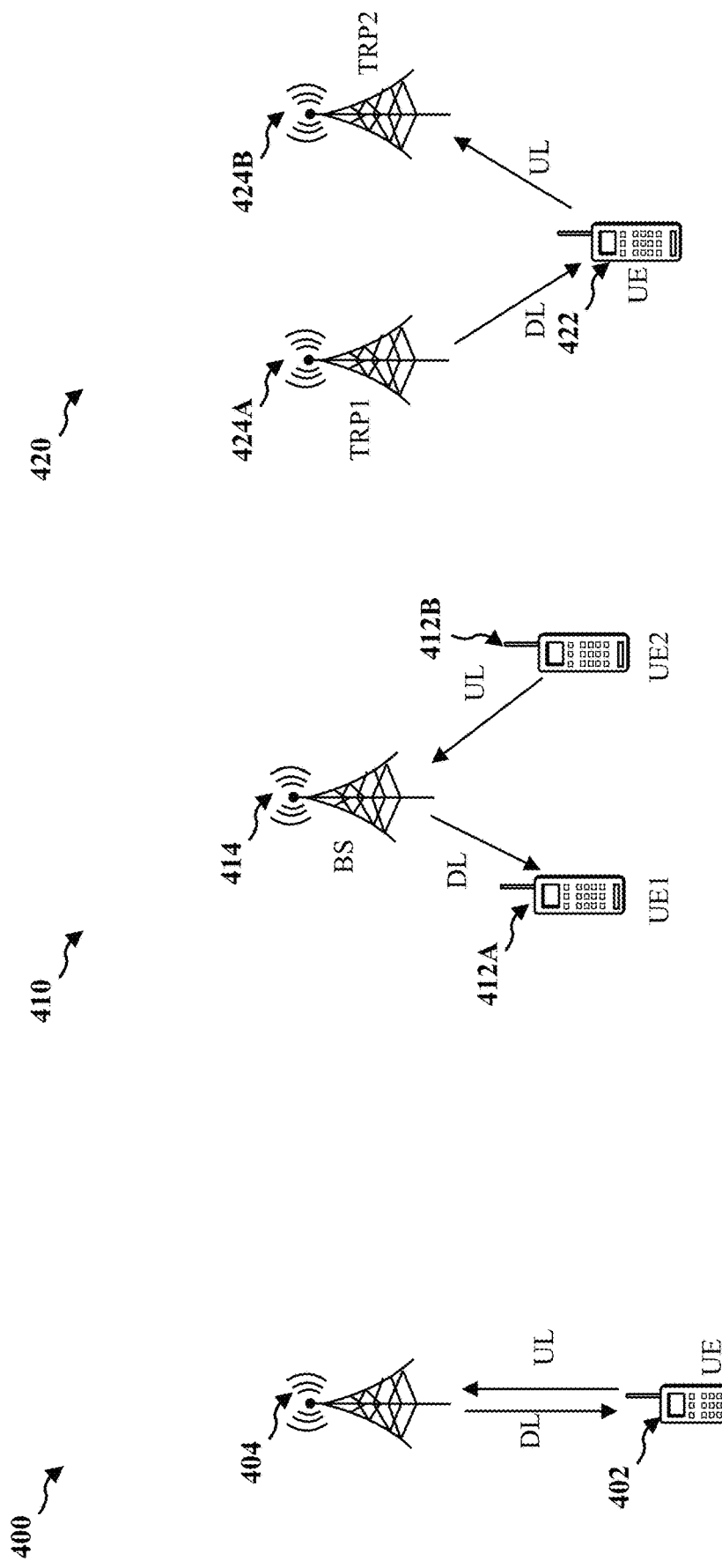

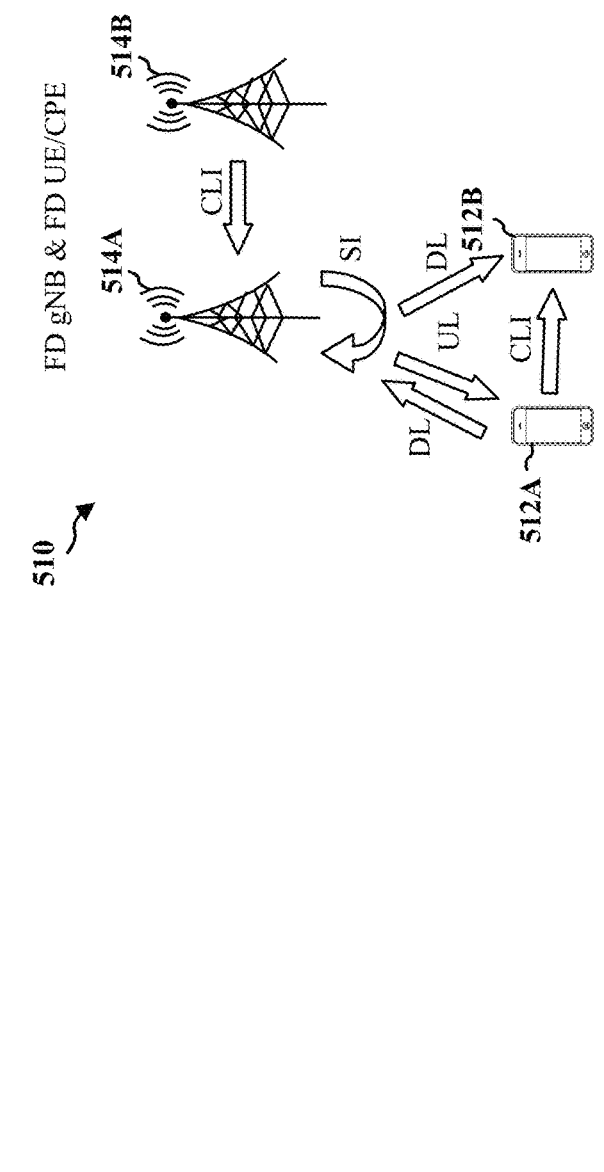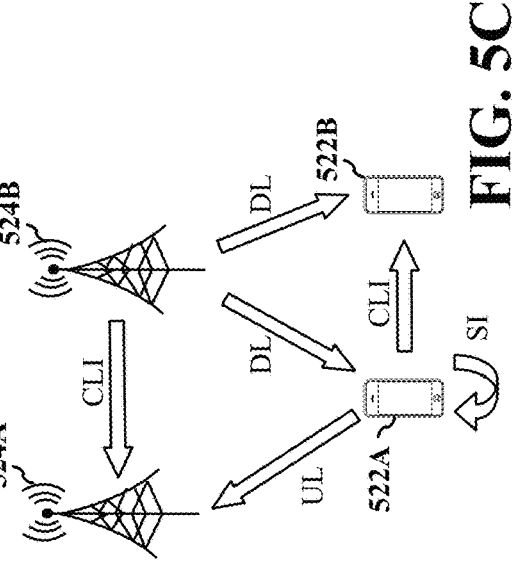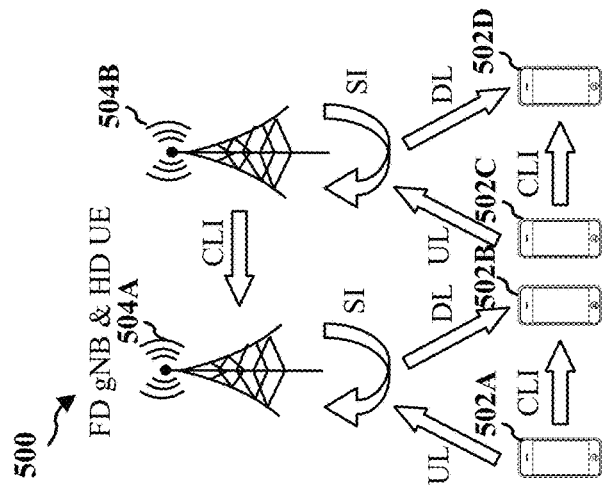
FIG. 5A
FIG. 5B
FIG. 5C

TYPE 0 RESOURCE ALLOCATION IN SUB-BAND FULL-DUPLEX SLOTS

TECHNICAL FIELD

The present disclosure relates generally to communication systems, and more particularly, to wireless communication systems with full-duplex (FD) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive a frequency domain resource allocation (FDRA) indication from a network entity, where the FDRA indication allocates a set of scheduling resources in a first band of a downlink (DL) band or an uplink (UL) band, where the FDRA indication includes an indication associated with a resource utilization in a second band of the UL band or the DL band, and where the DL band and the UL band overlap in a time domain. The memory and the at least one processor coupled to the memory may be further configured to receive, from the network entity, a radio resource control (RRC) configuration associated with a guard band between the UL band and the DL band. The memory and the at least one processor coupled to the memory may be further configured to communicate, with the network entity, a UL transmission or a DL transmission based on at least one of the set of scheduling resources, the guard band, or the resource utilization in the second band.

In another aspect of the disclosure, a method, a computer-readable medium, and an apparatus at a network entity are provided. The apparatus may include a memory and at least one processor coupled to the memory. The memory and the at least one processor coupled to the memory may be configured to transmit a FDRA indication for a UE, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. The memory and the at least one processor coupled to the memory may be further configured to transmit an RRC configuration associated with a guard band between the UL band and the DL band. The memory and the at least one processor coupled to the memory may be further configured to communicate, with the UE, a UL transmission or a DL transmission based on at least one of the set of scheduling resources, the guard band, or the resource utilization in the second band.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4A is a diagram illustrating example full duplex operations.

FIG. 4B is a diagram illustrating example full duplex operations.

FIG. 4C is a diagram illustrating example full duplex operations.

FIG. 5A is a diagram illustrating example communication between full duplex network entity and half duplex UE.

FIG. 5B is a diagram illustrating example communication between full duplex network entity and full duplex UE.

FIG. 5C is a diagram illustrating example communication between half duplex network entity and full duplex UE.

DETAILED DESCRIPTION

Figure 1:
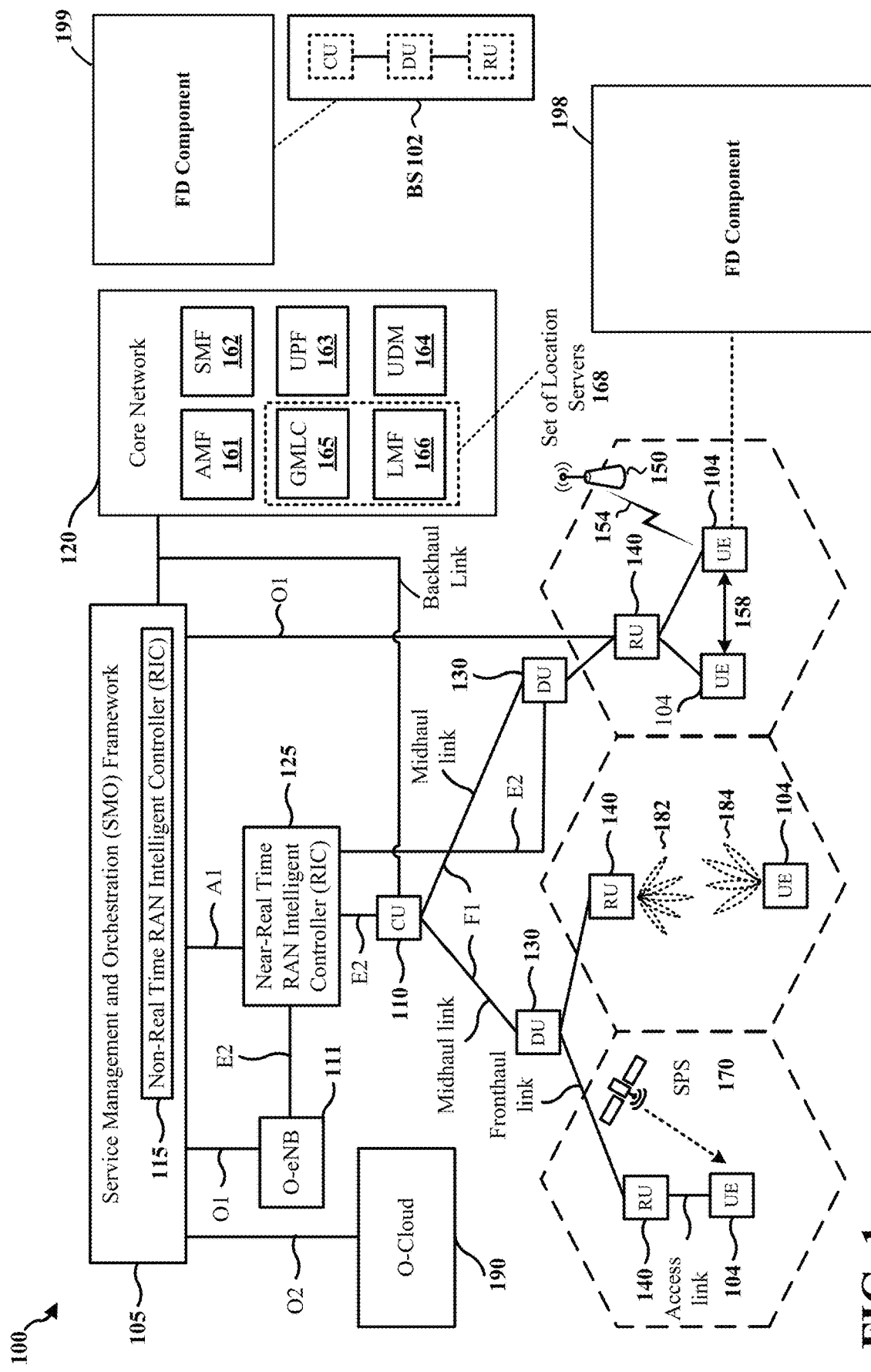
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an FD component 198. In some aspects, the FD component 198 may be configured to receive a FDRA indication from a network entity, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. In some aspects, the FD component 198 may be further configured to receive, from the network entity, an RRC configuration associated with a guard band between the UL band and the DL band. In some aspects, the FD component 198 may be further configured to communicate, with the network entity, a UL transmission or a DL transmission based on at least one of the set of scheduling resources, the guard band, or the resource utilization in the second band.

In certain aspects, the base station 102 may include an FD component 199. In some aspects, the FD component 199 may be configured to transmit a FDRA indication for a UE, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. In some aspects, the FD component 199 may be further configured to transmit an RRC configuration associated with a guard band between the UL band and the DL band. In some aspects, the FD component 199 may be further configured to communicate, with the UE, a UL transmission or a DL transmission based on at least one of the set of scheduling resources, the guard band, or the resource utilization in the second band.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of)

a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
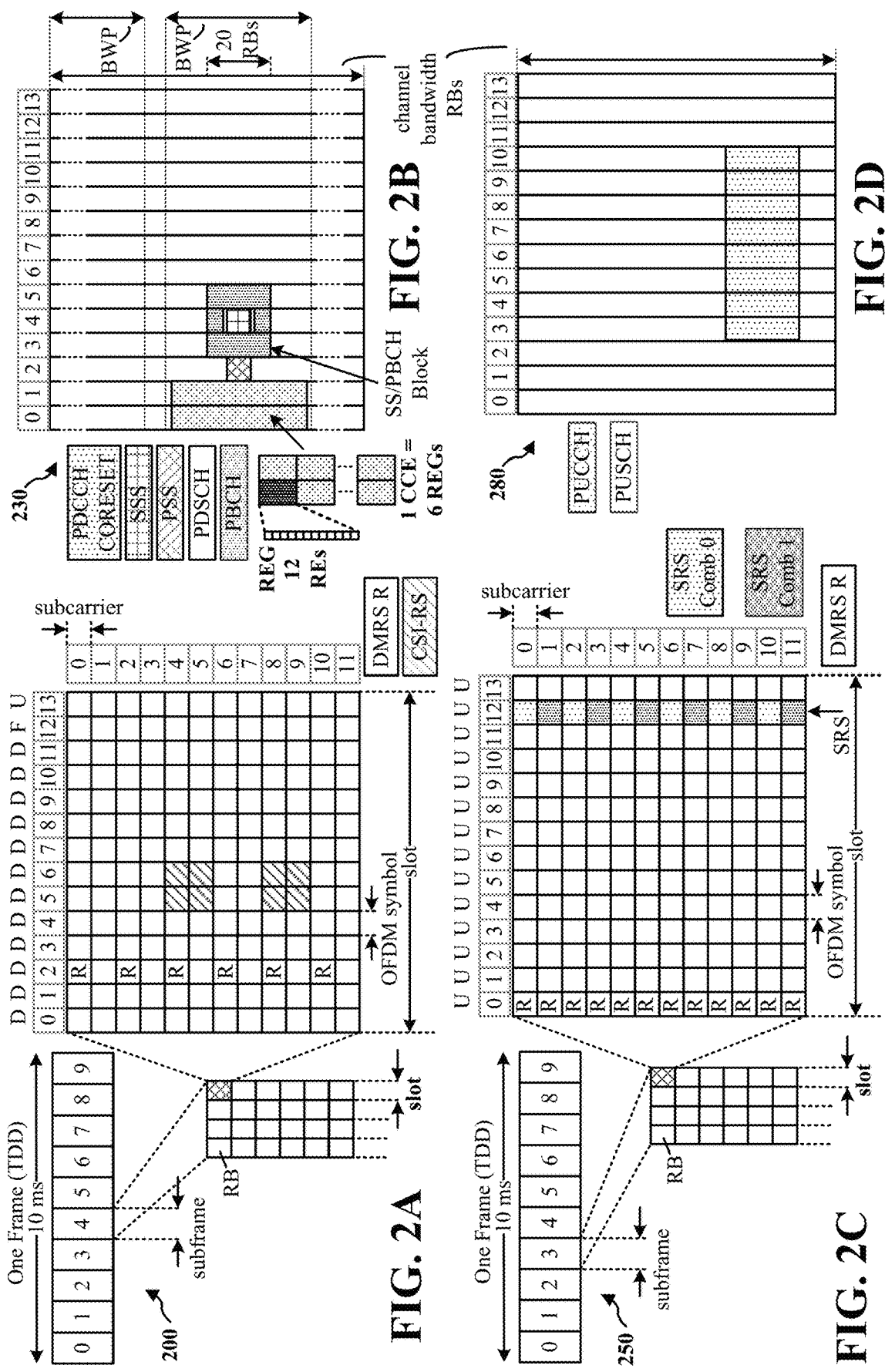
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology θ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
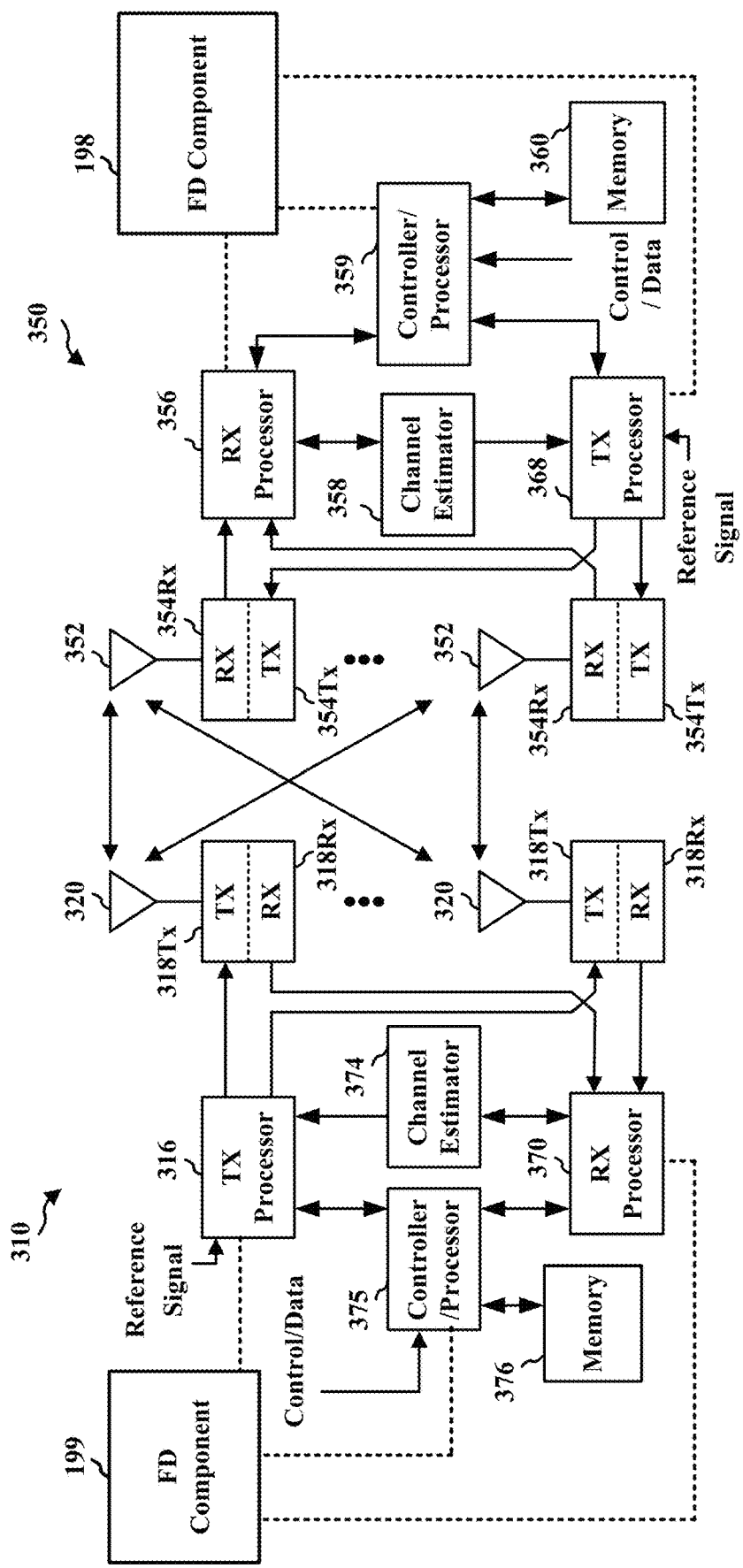
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with FD component 198 of FIG. 1.

At least one of the TX processor 316, the RX processor 370, and the controller/processor 375 may be configured to perform aspects in connection with FD component 199 of FIG. 1.

In some wireless communication systems, full-duplex (FD) capability (supporting simultaneous UL or DL transmission) may be present at the network entity (such as a base station), the UE, or both the network entity and the UE. For example, at the UE, UL transmissions may be transmitted from a first panel of the UE while simultaneous DL receptions may be received at a second panel of the UE. The first panel and the second panel may be different panels of the antenna(s) on the UE. As another example, at the base station, UL receptions may be received from a first panel of the base station while simultaneous DL transmissions may be transmitted at a second panel of the base station. The first panel and the second panel may be different panels of the antenna(s) on the base station.

By supporting FD, latency of communications may be potentially reduced. For example, it may be possible for a UE to receive DL signal in slots assigned for UL, which may enable latency savings. Furthermore, by supporting FD, spectrum efficiency per cell and per UE may be improved because resource utilization over the spectrum may be more efficient.

FIG. 4A is a diagram 400 illustrating example full duplex operations. As illustrated in FIG. 4A, an FD TRP 404 of a network entity may be transmitting DL communications to an FD UE 402 while receiving UL communications from the FD UE 402. The FD UE 402 may be transmitting UL communications to the FD TRP 404 while receiving DL communications from the FD TRP 404.

FIG. 4B is a diagram 410 illustrating example full duplex operations. As illustrated in FIG. 4B, an FD TRP 414 of a network entity may be transmitting DL communications to a first UE 412A while receiving UL communications from a second UE 412B. In some aspects, the first UE 412A and the second UE 412B may be half-duplex (HD) and may not support FD operations. In some aspects, the first UE 412A and the second UE 412B may support FD operations and may be operating in a HD mode.

FIG. 4C is a diagram 420 illustrating example full duplex operations. As illustrated in FIG. 4C, an FD UE 422 may be simultaneously connected to a first TRP 424A and a second TRP 424B. The FD UE 422 may be receiving DL communications from the first TRP 424A while transmitting UL communications to the second TRP 424B. In some aspects, the first TRP 424A and the second TRP 424B may be HD and may not support FD operations. In some aspects, the first TRP 424A and the second TRP 424B may support FD operations and may be operating in a HD mode.

FIG. 5A is a diagram 500 illustrating example communication between a full duplex network entity and a half duplex UE. As illustrated in diagram 500 in FIG. 5A, two TRPs, TRP 504A and TRP 504B operating in full-duplex mode and four UEs, UE 502A, UE 502B, UE 502C, and UE 502D operating in half-duplex mode are shown in the depicted example. While the TRP 504A may be simultaneously transmitting downlink data to the UE 502B and receiving uplink data from the UE 502A, self-inference between the uplink reception and the downlink transmission at the TRP 504A may occur. For example, a receiver at the TRP may receive the transmitted downlink signal as interference to the uplink signal. Similarly, self-interference between the uplink reception and the downlink transmission at the TRP 504B may occur. In some aspects, because the UE 502B may be receiving downlink data and the UE 502A may be simultaneously transmitting uplink data, the transmission from the UE 502A may cause cross-link interference (CLI) to the downlink signal being received by the UE 502B. Similarly, the transmission from the UE 502C may cause CLI to the downlink signal being received by the UE 502D. Moreover, because the TRP 504B may also be receiving uplink data from the UE 502C and transmitting downlink data to the UE 502D, CLI between the TRP 504A and the TRP 504B may occur.

FIG. 5B is a diagram 510 illustrating example communication between full duplex network entity and full duplex UE. As illustrated in diagram 500 in FIG. 5A, two TRPs, TRP 514A and TRP 514B operating in full-duplex mode and two UEs, UE 512A and UE 512B operating in full duplex mode are included. The TRP 514A may be transmitting a downlink transmission to the UE 512A while simultaneously receiving an uplink transmission from the UE 512A. The TRP 514A may be also transmitting a downlink transmission to the UE 512B. Self-interference from uplink transmission to downlink reception at the UE 512A may occur. Self-interference from downlink transmission to uplink reception at the TRP 514A may also occur. If the TRP 514B is transmitting at the same time, CLI may also occur at the TRP 514A.

FIG. 5C is a diagram 520 illustrating example communication between half duplex network entity and full duplex UE. As illustrated in FIG. 5C, a TRP 524A and a TRP 524B may be operating in a HD mode and a UE 522A and a UE 522B may be operating in a FD mode. The UE 522A may be simultaneously transmitting an uplink transmission to the TRP 524A and receiving a downlink transmission from the TRP 524B. At the same time, the UE 522B may be receiving a downlink transmission from the TRP 524B. Self-interference from uplink transmission to downlink reception at the UE 522A may occur. CLI may also occur for the UE 522B because the UE 522B may receive the uplink transmission from the UE 522A while receiving the downlink transmission from the TRP 524B.

Figures 6A, 6B:
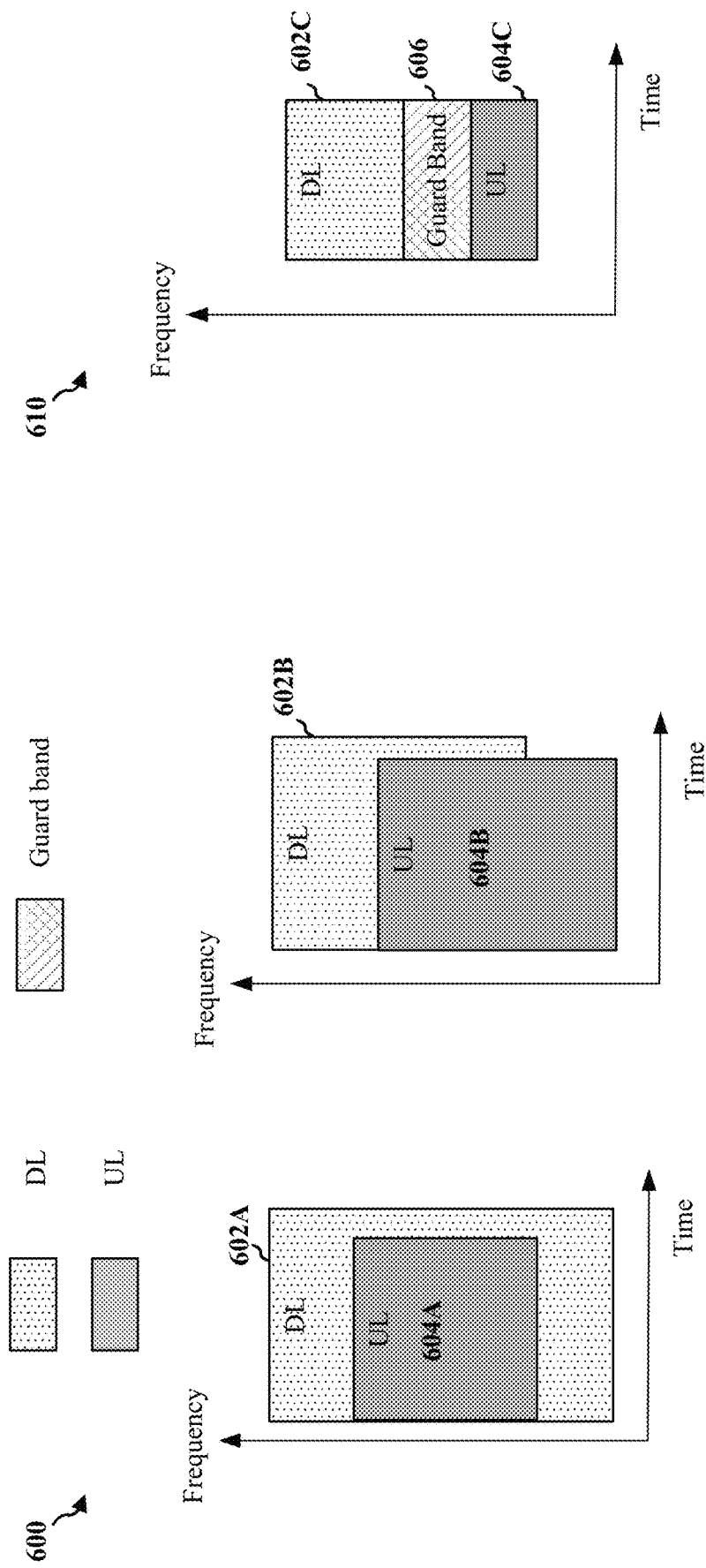
FIG. 6A is a diagram illustrating a first type of full-duplex communication.
FIG. 6B is a diagram illustrating a first type of full-duplex communication.

Full-duplex operation may be in the form of in-band full-duplex (IBFD) or sub-band frequency division duplexing (FDD) (otherwise known as "flexible duplex"). As illustrated in diagram 600 in FIG. 6A, for IBFD, the transmission and reception may occur at the same time, e.g., overlapping in time, and on the same frequency resource, e.g., using overlapping frequency resources. As illustrated in FIG. 6A, the IBFD time/frequency resources for downlink 602A and IBFD time/frequency resources for uplink 604A may be fully overlapped in some examples. In other examples, IBFD time/frequency resources for downlink 602B and IBFD time/frequency resources for uplink 604B may be partially overlapped, as illustrated in FIG. 6A.

For sub-band FDD, as illustrated in diagram 610 in FIG. 6B, the transmission and reception may occur at the same time, e.g., at least partially overlapping in time, but on different frequency resources. The downlink resources 602C may be separated from the uplink resources 604C in frequency domain. The separation may be referred to as a guard band 606, for example, and may provide a frequency gap or frequency separation between the downlink resources 602C and the uplink resources 604C.

Figure 7:
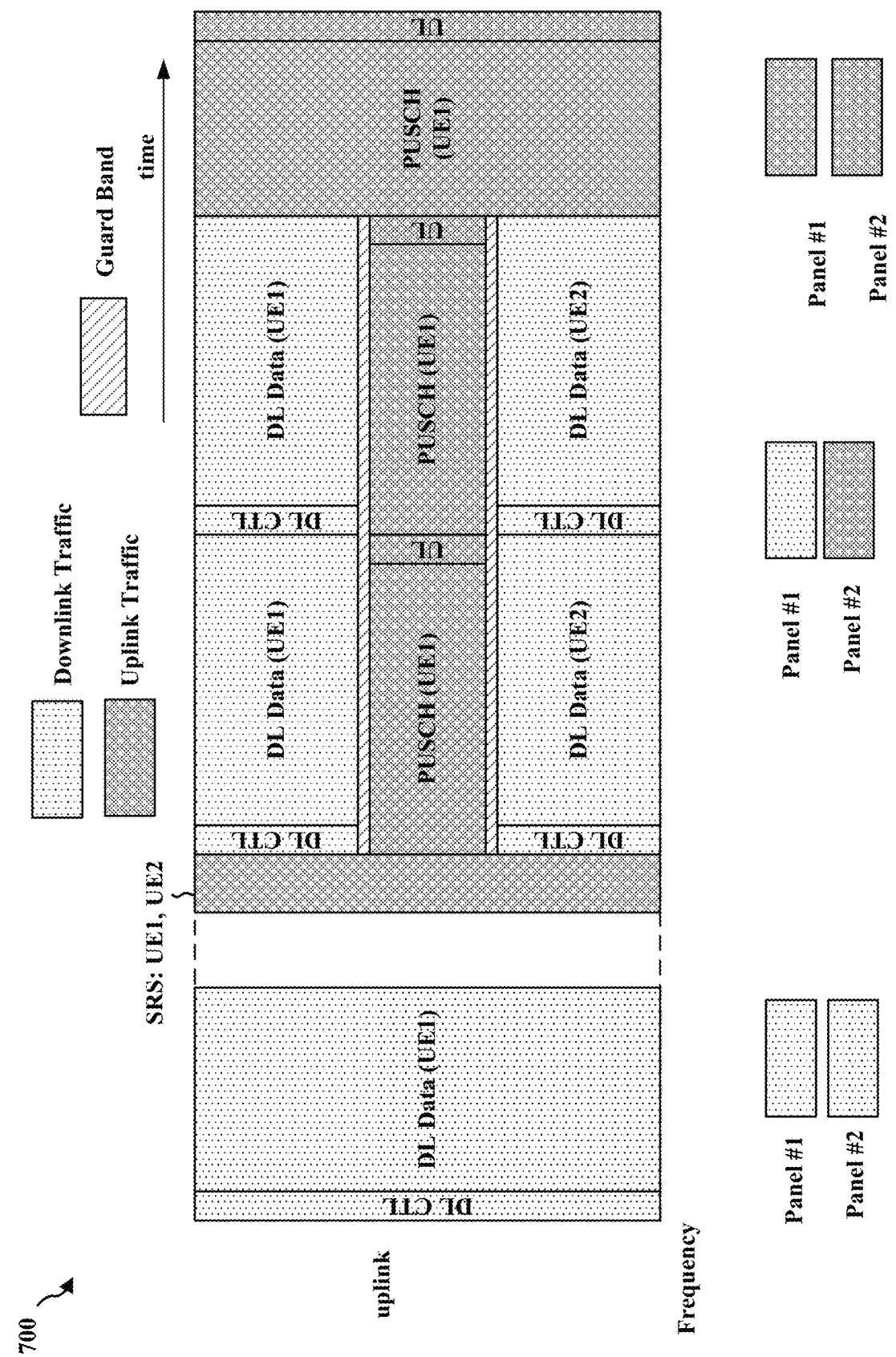
FIG. 7 is a diagram illustrating example slot format for full-duplex communication.

FIG. 7 is a diagram 700 illustrating example slot format for full-duplex communication. A slot format may include a "D+U" slot in which the band may be used for both UL and DL transmissions. The DL and UL transmissions may occur in overlapping bands (in-band full-duplex) or adjacent bands (sub-band full-duplex). In a "D+U" symbol, a HD UE may either transmit in the UL band or receive in the DL band. In a "D+U" symbol, the FD UE may transmit in the UL band and receive in the DL band in the same slot. A "D+U" slot may include DL symbols, UL symbols or full-duplex symbols.

An FDRA may be representing resources allocated in a frequency domain which may specify the way in which a scheduler (e.g., network) allocate resource blocks for each transmission. A first type of FDRA, FDRA type 0 may be allocating disjoint (non-consecutive) RBs. The FDRA type 0 may include a bitmap representing the RBs to indicate the RBs. As an example, the bitmap may be either 18 bits or 9 bits. The FDRA type 0 may allocate RBs in multiple RB groups (RBGs) and the RBG size for each RBG may depend on a bandwidth part (BWP) size. A second type of FDRA, FDRA type 1, may be allocating consecutive RBs. The FDRA type 1 may include an indication for a starting point of the allocated RBs (e.g., represented by a parameter RB_start) and an indication for a quantity of consecutive RBs which may be combined in a resource indicator value (RIV) field.

In some aspects, SBFD slots may include both DL band and UL band, and potentially a guard band. Based on the different frequency allocation, a part of the BWP may overlap with the corresponding sub-band. For example, the DL sub-band may be in the lower half of the band while the DL BWP may span the entire band. A bitmap in Type 0 FDRA may include bits that correspond to RBs outside of the transmission band, which may not be used. A FD UE may be indicated with (e.g., via RRC configuration) partitions for DL band, UL band, or guard band; but the effective guard band (the band between DL reception and UL transmission) may be a function of the network's scheduling. As used herein, the term "RRC configuration" may refer to various configuration for a UE sent via RRC signaling, such as a DL band, UL band, or guard band configuration. For example, if the guard band is configured to be 5 RBs but there is no UL transmission simultaneous (e.g., overlap in time) with the DL reception, the effective guard band may be much larger than 5 RBs. Aspects provided herein may enable a UE to adapt its transmission or reception procedures based on an effective guard band that may be calculated based on a bitmap in the FDRA (e.g., FDRA type 0), improving overall power efficiency of the UE. For example, during the reception of a DL transmission, if an effective guard band is large, the UE may not apply strict filtering which may lead to energy saving at the UE.

Figure 8:
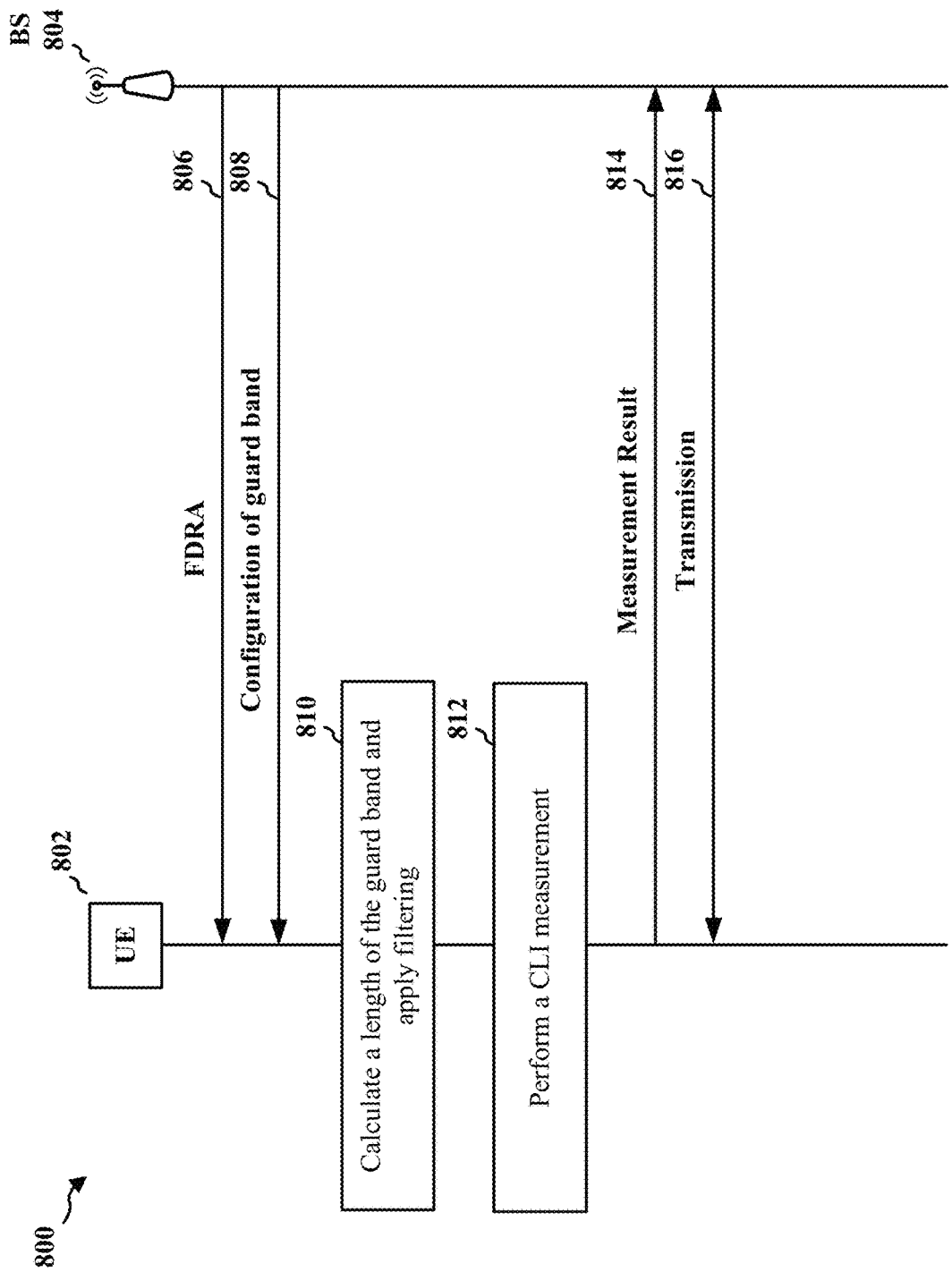
FIG. 8 is a diagram illustrating example communications between a network entity and a UE.

FIG. 8 is a diagram 800 illustrating example communications between a network entity 804 and a UE 802. In some aspects, the network entity 804 may be implemented as an aggregated base station, a disaggregated base station, an integrated access and backhaul (IAB) node, a relay node, a sidelink node, or the like. In some aspects, the network entity 804 may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

Figure 9:
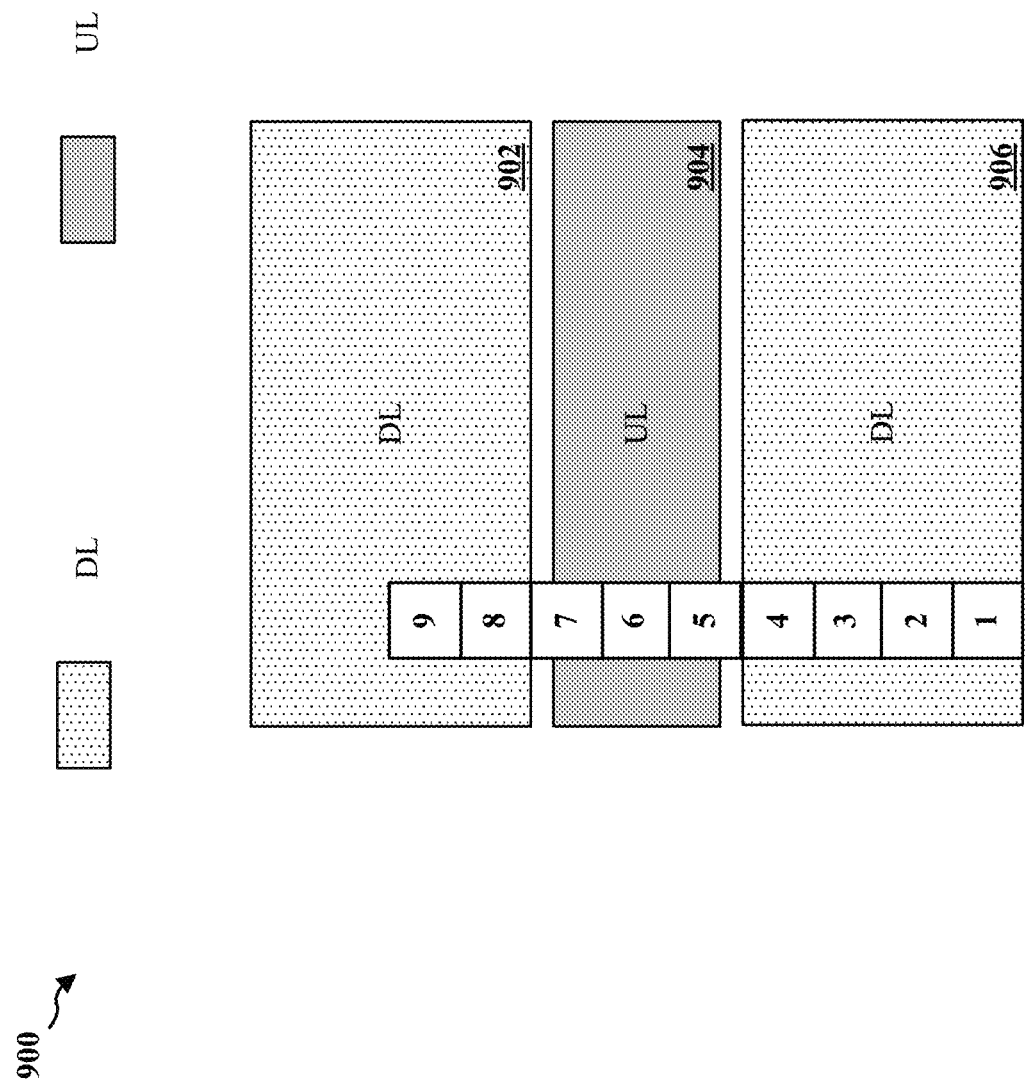
FIG. 9 is a diagram illustrating FDRA allocation for full-duplex communication.

As illustrated in FIG. 8, the UE 802 may receive an FDRA indication 806 from the network entity 804. As used herein, the term "FDRA indication" may refer to a signaling for indicating an FDRA, such as FDRA including a bitmap for configuring frequency domain resources for a UE. In some aspects, the FDRA indication 806 may be a type 0 FDRA for a SBFD slot. In some aspects, the FDRA indication 806 may be allocating the scheduling resources in the corresponding band (a DL band or a UL band) and may also be indicating of resources utilized or not utilized by the network entity 804 or other UEs in the other direction (UL or DL). As used herein, the term "scheduling resources" may refer to resources that may be scheduled for a data channel transmission. For example, FIG. 9 is a diagram 900 illustrating FDRA allocation for full-duplex communication. As illustrated in FIG. 9, there may be a DL band 902, a UL band 904, and a DL band 906. Gaps between the DL band 902, the UL band 904, and the DL band 906 may be guard bands configured based on an RRC configuration, such as configuration 808. Bits 1, 2, 3, 4, 8, and 9 may be associated with the FDRA allocation for DL scheduling for the UE 802 while bits 5, 6, 7, may be associated with the indication of resources utilized or not utilized by the network entity 804 or other UEs in the other direction (UL or DL). For example, the network entity 804 may be utilizing (e.g., schedule an UL grant) in resources (e.g., RBGs) corresponding to (e.g., mapped to) bits 5 and 6 and may not be utilizing resources (e.g., RBGs) corresponding to (e.g., mapped to) bit 7, which in turn means that the resources corresponding to bit 7 may not cause interference to DL transmission at the UE 802. Therefore, the resources corresponding to bit 7 may serve as an effective guard band. The UE may also perform CLI measurements at 1010 based on the utilized resources corresponding to bits 8 and 6. As used herein, the term "CLI measurement" may refer to one or more measurements that may be performed for estimating CLI, such as reference signal received power (RSRP) or received signal strength indicator (RSSI) measurement performed on transmissions intended for other network entities or UEs.

Figure 10:
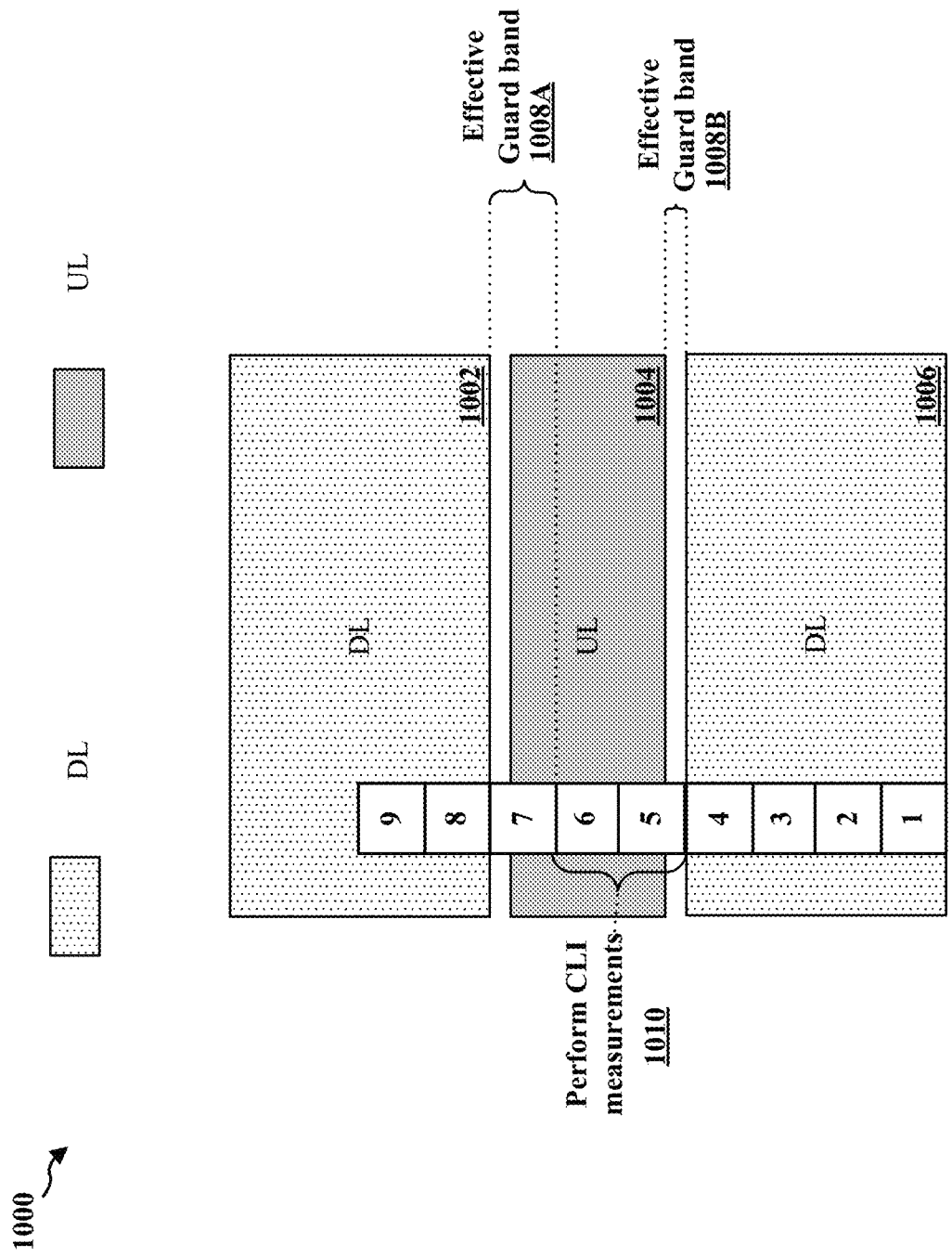
FIG. 10 is a diagram illustrating FDRA allocation for full-duplex communication.

FIG. 10 is a diagram 1000 illustrating FDRA allocation for full-duplex communication. As illustrated in FIG. 10, there may be a DL band 1002, a UL band 1004, and a DL band 1006. Gaps between the DL band 1002, the UL band 1004, and the DL band 1006 may be guard bands configured based on an RRC configuration, such as configuration 808. Bits 1, 2, 3, 4, 8, and 9 may be associated with the FDRA allocation for DL scheduling for the UE 802 while bits 5, 6, 7, may be associated with the indication of resources utilized or not utilized by the network entity 804 or other UEs in the other direction (which may be UL or DL). For example, the network entity 804 may be utilizing (e.g., schedule an UL grant) in resources (e.g., RBGs) corresponding to (e.g., mapped to) bits 5 and 6 and may not be utilizing resources (e.g., RBGs) corresponding to (e.g., mapped to) bit 7, which in turn means that the resources corresponding to bit 7 may not cause interference to DL transmission at the UE 802. Therefore, the resources corresponding to bit 7 may serve as an effective guard band. Based on the FDRA allocation, the effective guard band 1008A between the DL band 1002 and the UL band 1004 may accordingly include the gap between the DL band 1002 and the UL band 1004 and frequencies corresponding to resources mapped to bit 7. The effective guard band 1008B between the DL band 1006 and the UL band 1004 may be the gap between the DL band 1006 and the UL band 1004. After the UE 802 receives the FDRA indication 806 from the network entity 804 and becomes aware of the resources utilized or not utilized, the UE 802 may accordingly perform at least one of: (1) calculate the effective guard band and apply filtering at 810 to achieve an emission specification or (2) perform CLI measurements in the utilized resources at 812 and transmit a measurement result 814 (e.g., in a configured resource) to the network entity 804 to report the CLI measurements. Based on the calculated effective guard band and the applied filtering, the UE 802 and the network entity 804 may communicate DL or UL transmission 816.

Figure 11:
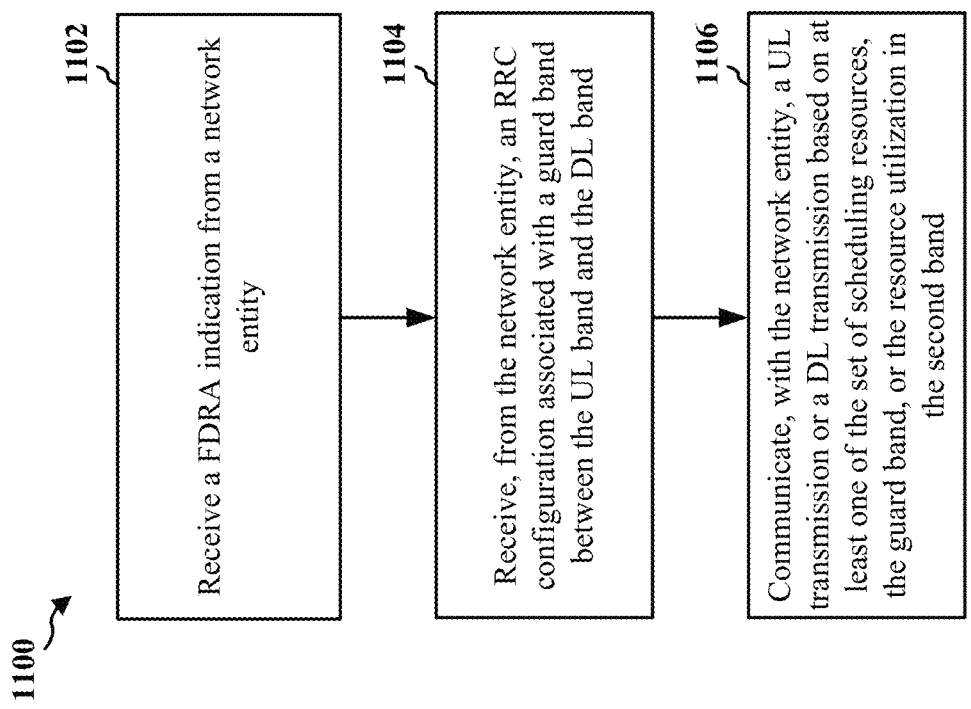
FIG. 11 is a flowchart of a method of wireless communication.

FIG. 11 is a flowchart 1100 of a method of wireless communication. The method may be performed by a UE (e.g., the UE 104, the UE 802, the apparatus 1304).

At 1102, the UE may receive a FDRA indication from a network entity, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. For example, the UE 802 may receive a FDRA indication (e.g., 806) from a network entity 804, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. In some aspects, 1102 may be performed by the FD component 198. In some aspects, the set of scheduling resources includes one or more RBs that are non-continuous in a frequency domain. In some aspects, the FDRA indication may represent the set of scheduling resources in the first band in a first bitmap, and the FDRA indication may represent the resource utilization in the second band in a second bitmap. In some aspects, the FDRA indication may represent the set of scheduling resources in the first band in a bitmap and the FDRA indication may represent the resource utilization in the second band in the bitmap.

At 1104, the UE may receive, from the network entity, an RRC configuration associated with a guard band between the UL band and the DL band. For example, the UE 802 may receive, from the network entity, an RRC configuration (e.g., 808) associated with a guard band between the UL band and the DL band. In some aspects, 1104 may be performed by the FD component 198.

In some aspects, the UE may calculate a length of the guard band between the UL band and the DL band and may apply a filtering based on the RRC configuration associated with the guard band and the resource utilization in the second band. In some aspects, the UE may perform a CLI measurement in the second band based on the resource utilization and may transmit a result of the CLI measurement to the network entity.

At 1106, the UE may communicate, with the network entity, a UL transmission or a DL transmission based on at least one of the set of scheduling resources, the guard band, or the resource utilization in the second band. For example, the UE 802 may communicate, with the network entity, a UL transmission or a DL transmission (e.g., 816) based on at least one of the set of scheduling resources, the guard band, or the resource utilization in the second band. In some aspects, 1106 may be performed by the FD component 198.

Figure 12:
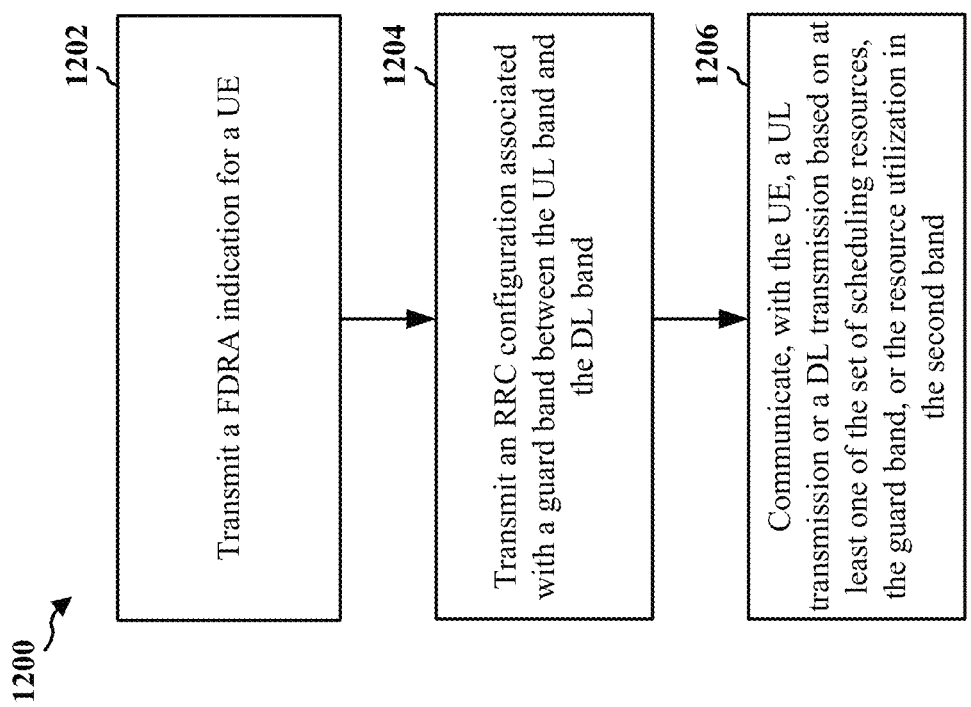
FIG. 12 is a flowchart of a method of wireless communication.

FIG. 12 is a flowchart 1200 of a method of wireless communication. The method may be performed by a network entity (e.g., the base station 102, the network entity 1302, the network entity 804, the network entity 1402).

At 1202, the network entity may transmit a FDRA indication for a UE, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. For example, the network entity 804 may transmit a FDRA indication (e.g., 808) for a UE 802, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. In some aspects, 1202 may be performed by the FD component 199. In some aspects, the set of scheduling resources includes one or more RBs that are non-continuous in a frequency domain. In some aspects, the FDRA indication may represent the set of scheduling resources in the first band in a first bitmap, and the FDRA indication may represent the resource utilization in the second band in a second bitmap. In some aspects, the FDRA indication may represent the set of scheduling resources in the first band in a bitmap and the FDRA indication may represent the resource utilization in the second band in the bitmap.

At 1204, the network entity may transmit an RRC configuration associated with a guard band between the UL band and the DL band. For example, the network entity 804 may transmit an RRC configuration (e.g., 810) associated with a guard band between the UL band and the DL band. In some aspects, 1204 may be performed by the FD component 199. In some aspects, the network entity may receive a result of a CLI measurement in the second band based on the resource utilization.

At 1206, the network entity may communicate, with the UE, a UL transmission or a DL transmission based on at least one of the set of scheduling resources, the guard band, or the resource utilization in the second band. For example, the network entity 804 may communicate, with the UE, a UL transmission or a DL transmission (e.g., 816) based on at least one of the set of scheduling resources, the guard band, or the resource utilization in the second band. In some aspects, 1206 may be performed by the FD component 199.

Figure 13:
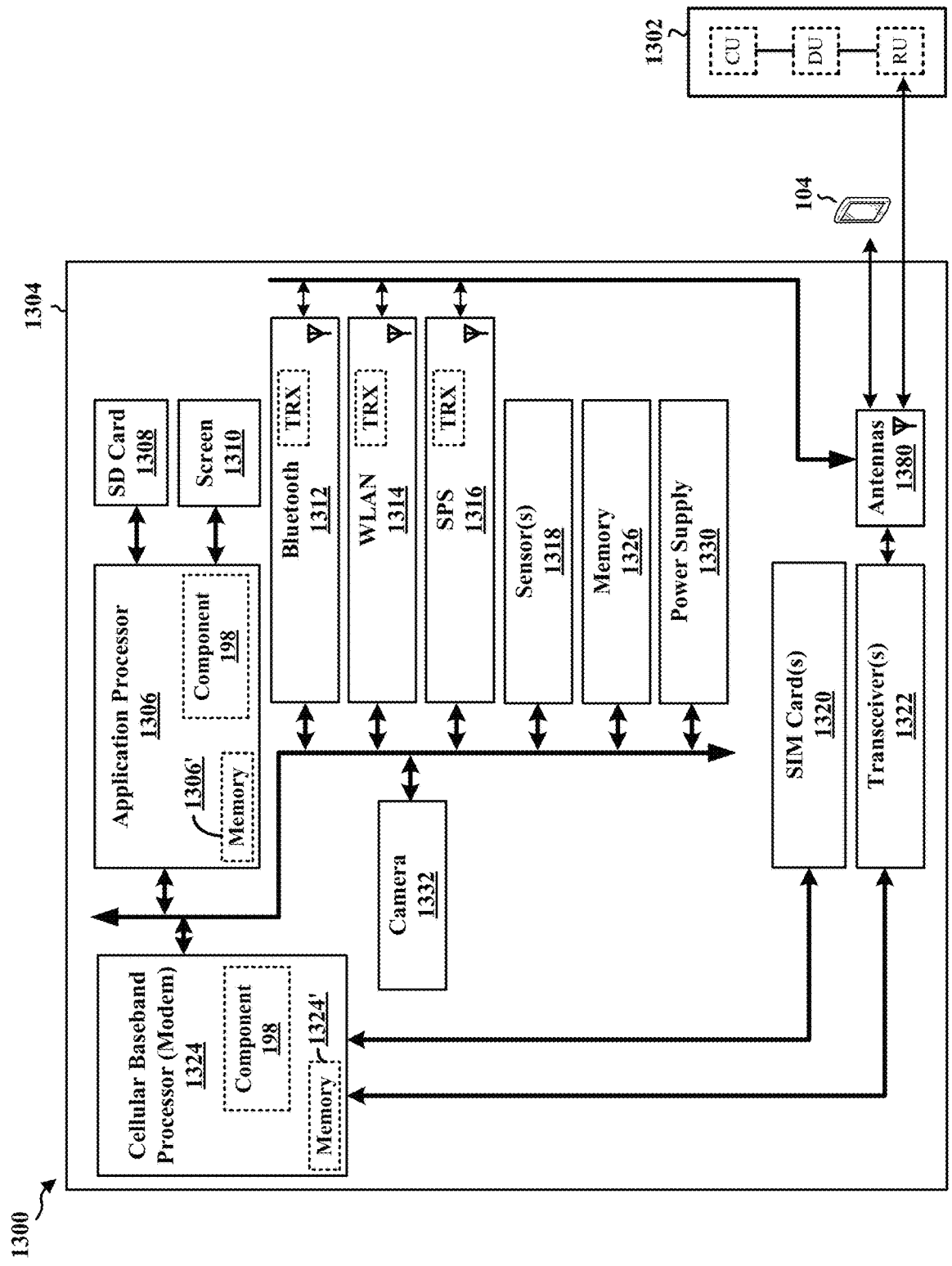
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, a satellite system module 1316 (e.g., GNSS module), one or more sensor modules 1318 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the satellite system module 1316 may include an on-chip transceiver (TRX)/receiver (RX). The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described herein. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed herein, the FD component 198 may be configured to receive a FDRA indication from a network entity, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. In some aspects, the FD component 198 may be further configured to receive, from the network entity, an RRC configuration associated with a guard band between the UL band and the DL band. In some aspects, the FD component 198 may be further configured to communicate, with the network entity, a UL transmission or a DL transmission based on at least one of the set of scheduling resources, the guard band, or the resource utilization in the second band. The FD component 198 may be within the cellular baseband processor 1324, the application processor 1306, or both the cellular baseband processor 1324 and the application processor 1306. The FD component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for receiving a FDRA indication from a network entity, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. In some aspects, the apparatus 1304 may further include means for receiving, from the network entity, an RRC configuration associated with a guard band between the UL band and the DL band. In some aspects, the apparatus 1304 may further include means for communicating, with the network entity, a UL transmission or a DL transmission based on at least one of the set of scheduling resources, the guard band, or the resource utilization in the second band. In some aspects, the apparatus 1304 may further include means for calculating a length of the guard band between the UL band and the DL band. In some aspects, the apparatus 1304 may further include means for applying a filtering based on the RRC configuration associated with the guard band and the resource utilization in the second band. In some aspects, the apparatus 1304 may further include means for performing a CLI measurement in the second band based on the resource utilization. In some aspects, the apparatus 1304 may further include means for transmitting a result of the CLI measurement to the network entity. The means may be the FD component 198 of the apparatus 1304 configured to perform the functions recited by the means. As described herein, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
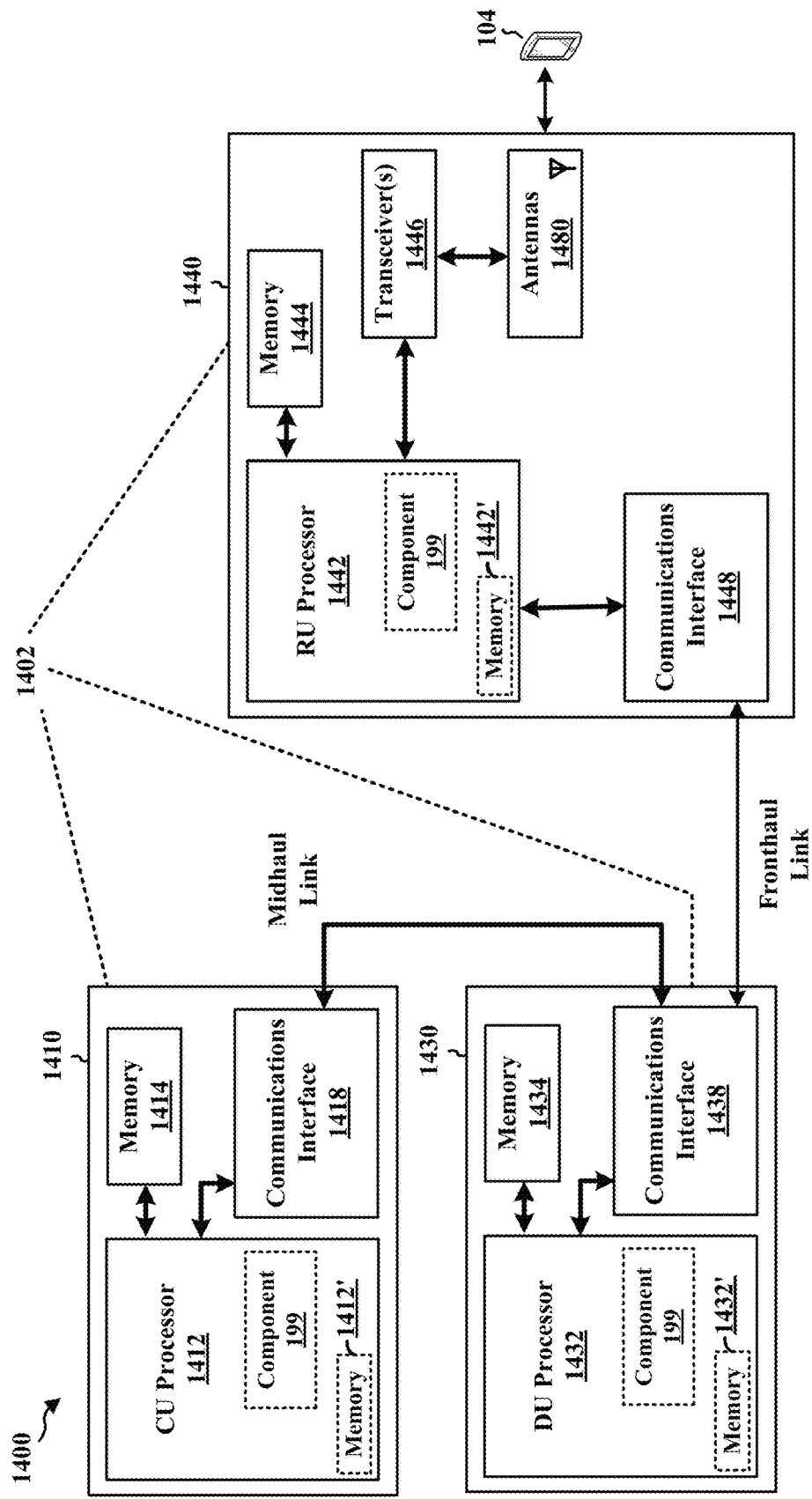
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the FD component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 143T. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the FD component 199 may be configured to transmit a FDRA indication for a UE, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. In some aspects, the FD component 199 may be further configured to transmit an RRC configuration associated with a guard band between the UL band and the DL band. In some aspects, the FD component 199 may be further configured to communicate, with the UE, a UL transmission or a DL transmission based on at least one of the set of scheduling resources, the guard band, or the resource utilization in the second band. The FD component 199 may be within one or more processors of one or more of the CU 1410, DU 1430, and the RU 1440. The FD component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for transmitting a FDRA indication for a UE, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain. In some aspects, the network entity 1402 may further include means for transmitting an RRC configuration associated with a guard band between the UL band and the DL band. In some aspects, the network entity 1402 may further include means for communicating, with the UE, a UL transmission or a DL transmission based on at least one of the set of scheduling resources, the guard band, or the resource utilization in the second band. In some aspects, the network entity 1402 may further include means for receiving a result of a CLI measurement in the second band based on the resource utilization. The means may be the FD component 199 of the network entity 1402 configured to perform the functions recited by the means. As described herein, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication at a UE, including: a memory; and at least one processor coupled to the memory, where the at least one processor is configured to: receive a FDRA indication from a network entity, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain; receive, from the network entity, an RRC configuration associated with a guard band between the UL band and the DL band; and communicate, with the network entity, a UL transmission or a DL transmission based on at least one of the set of scheduling resources, the guard band, or the resource utilization in the second band.

Aspect 2 is the apparatus of aspect 1, where the at least one processor is configured to: calculate a length of the guard band between the UL band and the DL band; and apply a filtering based on the RRC configuration associated with the guard band and the resource utilization in the second band.

Aspect 3 is the apparatus of any of aspects 1-2, where the at least one processor is configured to: perform a CLI measurement in the second band based on the resource utilization; and transmit a result of the CLI measurement to the network entity.

Aspect 4 is the apparatus of any of aspects 1-3, where the set of scheduling resources includes one or more RBs that are non-continuous in a frequency domain.

Aspect 5 is the apparatus of any of aspects 1-4, where the FDRA indication represents the set of scheduling resources in the first band in a first bitmap, and where the FDRA indication represents the resource utilization in the second band in a second bitmap.

Aspect 6 is the apparatus of any of aspects 1-5, where the FDRA indication represents the set of scheduling resources in the first band in a bitmap, and where the FDRA indication represents the resource utilization in the second band in the bitmap.

Aspect 7 is an apparatus for wireless communication at a network entity, including: a memory; and at least one processor coupled to the memory, where the at least one processor is configured to: transmit a FDRA indication for a UE, where the FDRA indication allocates a set of scheduling resources in a first band of a DL band or a UL band, where the FDRA indication includes an indication associated with a resource utilization in a second band of the UL band or the DL band, and where the DL band and the UL band overlap in a time domain; transmit an RRC configuration associated with a guard band between the UL band and the DL band; and communicate, with the UE, a UL transmission or a DL transmission based on at least one of the set of scheduling resources, the guard band, or the resource utilization in the second band.

Aspect 8 is the apparatus of aspect 7, where the guard band is based on the RRC configuration and the resource utilization in the second band.

Aspect 9 is the apparatus of any of aspects 7-8, where the at least one processor is configured to: receive a result of a CLI measurement in the second band based on the resource utilization.

Aspect 10 is the apparatus of any of aspects 7-9, where the set of scheduling resources includes one or more RBs that are non-continuous in a frequency domain.

Aspect 11 is the apparatus of any of aspects 7-10, where the FDRA indication represents the set of scheduling resources in the first band in a first bitmap, and where the FDRA indication represents the resource utilization in the second band in a second bitmap.

Aspect 12 is the apparatus of any of aspects 7-11, where the FDRA indication represents the set of scheduling resources in the first band in a bitmap, and where the FDRA indication represents the resource utilization in the second band in the bitmap.

Aspect 13 is a method of wireless communication for implementing any of aspects 1 to 6.

Aspect 14 is an apparatus for wireless communication including means for implementing any of aspects 1 to 6.

Aspect 15 is a computer-readable medium storing computer executable code, where the code when executed by a processor causes the processor to implement any of aspects 1 to 6.

Aspect 16 is a method of wireless communication for implementing any of aspects 7 to 12.

Aspect 17 is an apparatus for wireless communication including means for implementing any of aspects 7 to 12.

Aspect 18 is a computer-readable medium storing computer executable code, where the code when executed by a processor causes the processor to implement any of aspects 7 to 12.

What is claimed is:

1. An apparatus for wireless communication at a user equipment (UE), comprising:
   memory; and
   at least one processor coupled to the memory, wherein the at least one processor is configured to:
      receive, from a network entity, a radio resource control (RRC) configuration that indicates a frequency guard band between an uplink (UL) band and a downlink (DL) band for a full-duplex resource;
      receive a frequency domain resource allocation (FDRA) indication from the network entity, wherein the FDRA indication allocates a set of scheduling resources for a transmission in a first band of the DL band or the UL band of the full-duplex resource, wherein the FDRA indication further comprises an indication associated with a resource utilization in a second band of the UL band or the DL band of the full-duplex resource, and wherein the resource utilization in the second band overlaps in a time domain with the set of scheduling resources for the transmission in the first band;
      calculate an effective frequency guard band for the full-duplex resource that is variable from the frequency guard band indicated in the RRC configuration, wherein the effective frequency guard band is calculated based on the RRC configuration and the indication of the resource utilization in the second band from the FDRA indication;
      adapt a transmission or reception procedure based on the effective frequency guard band that is different than the RRC configured frequency guard band; and
      communicate, with the network entity, an UL transmission or a DL transmission based on the set of scheduling resources and an adapted transmission or reception procedure that is adapted based on the effective frequency guard band.

2. The apparatus of claim 1, wherein, to adapt the transmission or reception procedure, the at least one processor is configured to:
   apply a filtering based on the effective frequency guard band that is different than the RRC configured frequency guard band.

3. The apparatus of claim 1, wherein, to adapt the transmission or reception procedure, the at least one processor is configured to:
   perform a cross link interference (CLI) measurement in the second band based on the effective frequency guard band that is different than the RRC configured frequency guard band; and
   transmit, to the network entity, a result of the CLI measurement performed in the second band.

4. The apparatus of claim 1, wherein the set of scheduling resources comprises one or more resource blocks (RBs) that are non-continuous in a frequency domain.

5. The apparatus of claim 1, wherein the FDRA indication represents the set of scheduling resources in the first band in a first bitmap, and wherein the FDRA indication represents the resource utilization in the second band in a second bitmap.

6. The apparatus of claim 1, wherein the FDRA indication represents the set of scheduling resources in the first band in a bitmap, and wherein the FDRA indication represents the resource utilization in the second band in the bitmap.

7. An apparatus for wireless communication at a network entity, comprising:
   memory; and
   at least one processor coupled to the memory, wherein the at least one processor is configured to:
      transmit a radio resource control (RRC) configuration that indicates a frequency guard band between an uplink (UL) band and a downlink (DL) band for a full-duplex resource;
      transmit a frequency domain resource allocation (FDRA) indication for a user equipment (UE), wherein the FDRA indication allocates a set of scheduling resources for a transmission in a first band of the DL band or the UL band of the full-duplex resource, wherein the FDRA indication further comprises an indication associated with a resource utilization in a second band of the UL band or the DL band of the full-duplex resource, and wherein the resource utilization in the second band overlaps in a time domain with the set of scheduling resources for the transmission in the first band; and
      communicate, with the UE, a UL transmission or a DL transmission based on the set of scheduling resources and an effective frequency guard band that is variable from the frequency guard band indicated in the RRC configuration, wherein the effective frequency guard band is based on the RRC configuration and the resource utilization in the second band.

8. The apparatus of claim 7, wherein the at least one processor is configured to:
   receive a result of a cross link interference (CLI) measurement in the second band based on the effective frequency guard band that is different than the RRC configured frequency guard band.

9. The apparatus of claim 7, wherein the set of scheduling resources comprises one or more resource blocks (RBs) that are non-continuous in a frequency domain.

10. The apparatus of claim 7, wherein the FDRA indication represents the set of scheduling resources in the first band in a first bitmap, and wherein the FDRA indication represents the resource utilization in the second band in a second bitmap.

11. The apparatus of claim 7, wherein the FDRA indication represents the set of scheduling resources in the first band in a bitmap, and wherein the FDRA indication represents the resource utilization in the second band in the bitmap.

12. A method of wireless communication at a user equipment (UE), comprising:
receiving, from a network entity, a radio resource control (RRC) configuration that indicates a frequency guard band between an uplink (UL) band and a downlink (DL) band for a full-duplex resource;
receiving a frequency domain resource allocation (FDRA) indication from the network entity, wherein the FDRA indication allocates a set of scheduling resources for a transmission in a first band of the DL band or the UL band of the full-duplex resource, wherein the FDRA indication further comprises an indication associated with a resource utilization in a second band of the UL band or the DL band of the full-duplex resource, and wherein the resource utilization in the second band overlaps in a time domain with the set of scheduling resources for the transmission in the first band;
calculating an effective frequency guard band for the full-duplex resource that is variable from the frequency guard band indicated in the RRC configuration, wherein the effective frequency guard band is calculated based on the RRC configuration and the indication of the resource utilization in the second band from the FDRA indication;
adapting a transmission or reception procedure based on the effective frequency guard band that is different than the RRC configured frequency guard band; and
communicating, with the network entity, an UL transmission or a DL transmission based on the set of scheduling resources and an adapted transmission or reception procedure that is adapted based on the effective frequency guard band.

13. The method of claim 12, wherein adapting the transmission or reception procedure further comprises:
applying a filtering based on the effective frequency guard band that is different than the RRC configured frequency guard band.

14. The method of claim 12, further comprising:
performing a cross link interference (CLI) measurement in the second band based on the effective frequency guard band that is different than the RRC configured frequency guard band; and
transmitting, to the network entity, a result of the CLI measurement performed in the second band.

15. The method of claim 12, wherein the set of scheduling resources comprises one or more resource blocks (RBs) that are non-continuous in a frequency domain.

16. The method of claim 12, wherein the FDRA indication represents the set of scheduling resources in the first band in a first bitmap, and wherein the FDRA indication represents the resource utilization in the second band in a second bitmap.

17. The method of claim 12, wherein the FDRA indication represents the set of scheduling resources in the first band in a bitmap, and wherein the FDRA indication represents the resource utilization in the second band in the bitmap.

18. A method of wireless communication at a network entity, comprising:
transmitting a radio resource control (RRC) configuration that indicates a frequency guard band between an uplink (UL) band and a downlink (DL) band for a full-duplex resource;
transmitting a frequency domain resource allocation (FDRA) indication for a user equipment (UE), wherein the FDRA indication allocates a set of scheduling resources for a transmission in a first band of the DL band or the UL band of the full-duplex resource, wherein the FDRA indication further comprises an indication associated with a resource utilization in a second band of the UL band or the DL band of the full-duplex resource, and wherein the resource utilization in the second band overlaps in a time domain with the set of scheduling resources for the transmission in the first band; and
communicating, with the UE, a UL transmission or a DL transmission based on the set of scheduling resources and an effective frequency guard band that is variable from the frequency guard band indicated in the RRC configuration, wherein the effective frequency guard band is based on the RRC configuration and the resource utilization in the second band.

19. The method of claim 18, further comprising:
receiving a result of a cross link interference (CLI) measurement in the second band based on the effective frequency guard band that is different than the RRC configured frequency guard band.

20. The method of claim 18, wherein the set of scheduling resources comprises one or more resource blocks (RBs) that are non-continuous in a frequency domain.

21. The method of claim 18, wherein the FDRA indication represents the set of scheduling resources in the first band in a first bitmap, and wherein the FDRA indication represents the resource utilization in the second band in a second bitmap.

22. The method of claim 18, wherein the FDRA indication represents the set of scheduling resources in the first band in a bitmap, and wherein the FDRA indication represents the resource utilization in the second band in the bitmap.

23. The apparatus of claim 1, further comprising a transceiver coupled to the at least one processor, wherein the at least one processor is configured to receive the RRC configuration and the FDRA indication via the transceiver.

24. The apparatus of claim 7, further comprising a transceiver coupled to the at least one processor, wherein the at least one processor is configured to transmit the RRC configuration and the FDRA indication via the transceiver.

25. The apparatus of claim 1, wherein the full-duplex resource is a sub-band full-duplex (SBFD) resource.

26. The apparatus of claim 7, wherein the full-duplex resource is a sub-band full-duplex (SBFD) resource.

* * * * *